(12) United States Patent
Kim et al.

(10) Patent No.: US 11,435,942 B2
(45) Date of Patent: Sep. 6, 2022

(54) METHOD AND APPARATUS FOR PROCESSING READ-WRITE-OPERATION INSTRUCTION IN PROCESSING-IN-MEMORY

(71) Applicant: Korea Electronics Technology Institute, Seongnam-si (KR)

(72) Inventors: Byung Soo Kim, Yongin-si (KR);
Young Jong Jang, Yongin-si (KR);
Young Kyu Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/136,813

(22) Filed: Dec. 29, 2020

(65) Prior Publication Data

US 2022/0011962 A1 Jan. 13, 2022

Related U.S. Application Data

(63) Continuation of application No. PCT/KR2020/009164, filed on Jul. 13, 2020.

(30) Foreign Application Priority Data

Jul. 10, 2020 (KR) ........................ 10-2020-0085574

(51) Int. Cl.
*G06F 3/06* (2006.01)
(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 6,345,000 | B1 * | 2/2002 | Wong | G11C 16/08 365/185.05 |
| 6,823,336 | B1 * | 11/2004 | Srinivasan | G06F 3/0611 |
| 7,679,970 | B2 * | 3/2010 | Hong | G11C 11/4099 365/189.04 |
| 8,189,422 | B2 * | 5/2012 | Lee | G11C 13/0004 365/230.03 |

(Continued)

*Primary Examiner* — Elias Mamo
(74) *Attorney, Agent, or Firm* — Knobbe Martens Olson & Bear LLP

(57) ABSTRACT

This application relates to a method and apparatus for processing a new read-write-operation instruction added to an instruction set to maximize the performance of processing-in-memory (PIM). The read-write-operation instruction performs reading and writing on an operation result of the PIM by returning the operation result of the PIM to a computer system and, at the same time, writing the operation result to a destination address. An instruction processor in PIM includes a response data selector and a finite state machine to process the read-write-operation instruction. The response data selector includes a selector configured to select one of a response data signal and an operation result, and a three-phase buffer configured to allow or disallow response data. The finite state machine of the instruction processor outputs a response permission signal and a response selection signal for controlling the buffer and the selector.

8 Claims, 4 Drawing Sheets

(56) References Cited

U.S. PATENT DOCUMENTS

| | | | |
|---|---|---|---|
| 9,741,442 B2 * | 8/2017 | Pichen | G11C 16/32 |
| 2011/0185114 A1 * | 7/2011 | Bolanowski | G06F 3/0659 |
| | | | 711/103 |
| 2018/0336035 A1 * | 11/2018 | Choi | G06F 15/785 |
| 2019/0065103 A1 * | 2/2019 | Ryu | G06F 3/0673 |

* cited by examiner

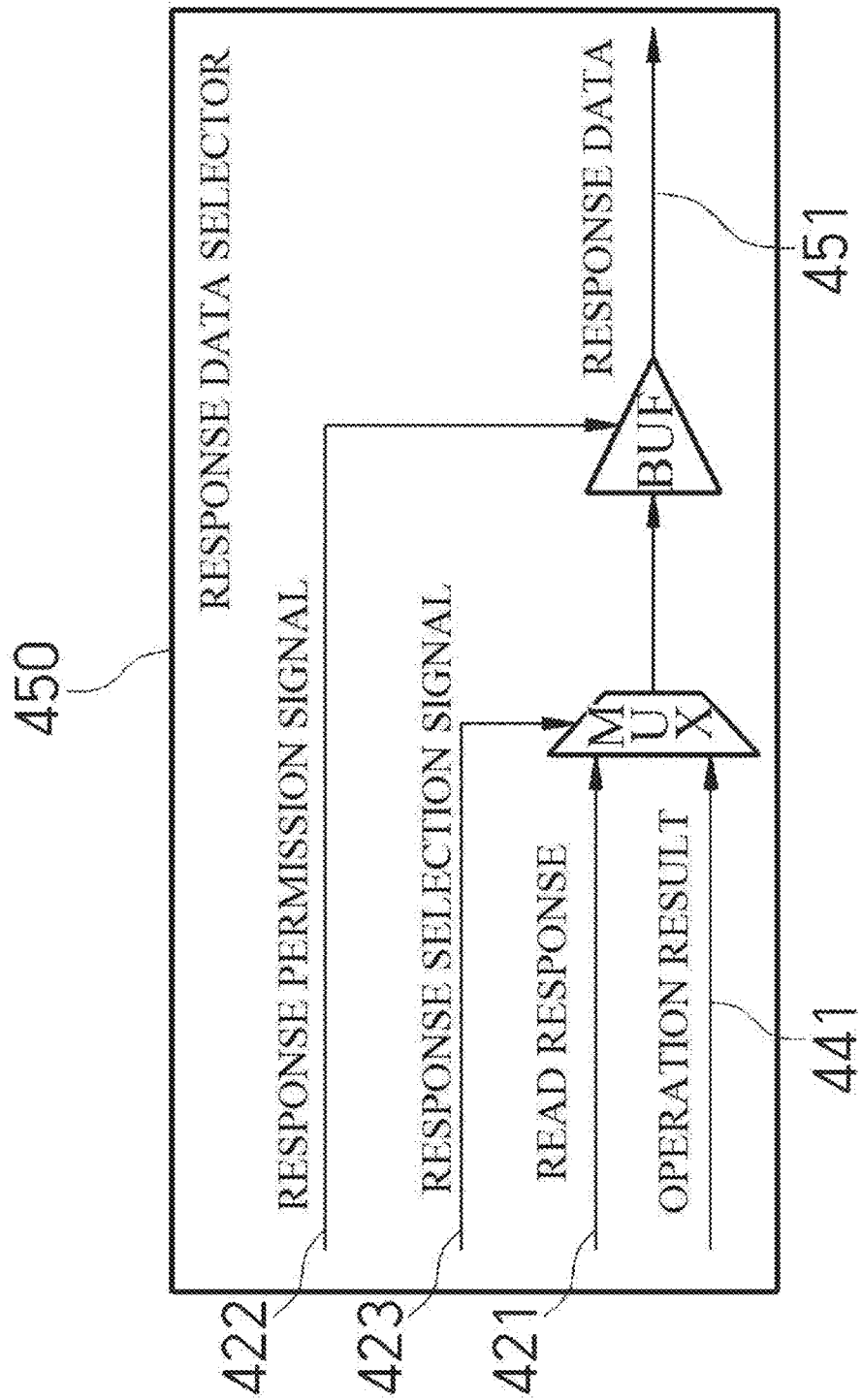

METHOD AND APPARATUS FOR PROCESSING READ-WRITE-OPERATION INSTRUCTION IN PROCESSING-IN-MEMORY

CROSS REFERENCE TO RELATED APPLICATIONS

This is a continuation application of International Patent Application No. PCT/KR2020/009164, filed on Jul. 13, 2020, which claims priority to Korean Patent Application No. 10-2020-0085574 filed on Jul. 10, 2020, contents of both of which are incorporated herein by reference in their entireties.

BACKGROUND

Technical Field

The described technology relates to a processing-in-memory (PIM), and more specifically, to a method of executing instructions and an operation function of a PIM and writing back the result, and a hardware structure therefor.

Description of Related Technology

A processing-in-memory (PIM) is a memory integrated with a processing unit as one chip and improves system performance and power efficiency by reducing the frequency with which a computer processor accesses the memory to perform operations. Unlike the traditional memory approach, the PIM approach of a computer processor uses instructions for operation in addition to address and data signals.

SUMMARY

One aspect is a method and apparatus for adding a new READ-WRITE-OPERATION instruction to an instruction set and processing the READ-WRITE-OPERATION instruction in order to maximize the performance of a processing-in-memory (PIM).

A READ-WRITE-OPERATION instruction is added to an instruction set of a processing-in-memory (PIM) in addition to a READ instruction, a WRITE instruction, a READ OPERATION instruction, and a WRITE-OPERATION instruction.

The READ-WRITE-OPERATION instruction simultaneously performs reading and writing on an operation result of the PIM by returning the operation result of the PIM to a computer system and, at the same time, writing the operation result to a destination address.

An instruction processor inside the PIM includes a response data selector and a finite slate machine in order to process the READ-WRITE-OPERATION instruction.

The response data selector of the instruction processor includes a selector configured to select one of a response data signal and an operation result, and a three-phase buffer configured to allow or disallow response data.

The finite state machine of the instruction processor outputs a response permission signal and a response selection signal for controlling the three-phase buffer and the selector of the response data selector.

The configuration and interaction of the described technology will become more apparent through specific embodiments described below with reference to the drawings.

According to the described technology, when a computer system using a processing-in-memory (PIM) requires the reading and writing of an operation result of the PIM, the PIM can process the reading and the writing at the same time. Accordingly, it is possible to reduce the number of times the computer system requests the PIM to perform the processing, and thus to improve the performance, and particularly, the processing rate of the computer system using the PIM.

BRIEF DESCRIPTION OF THE DRAWINGS

FIG. 4 is a structure diagram of a response data selector of FIG. 3.

DETAILED DESCRIPTION

A PIM has high hardware complexity and has degraded performance as a memory due to a processing unit of the PIM processing instructions received from a computer processor. Since the performance of the PIM as a memory should not be significantly degraded, the processing unit requires as little hardware complexity as possible and thus is designed to support only relatively simple operations. The PIM may perform various operations other than traditional memory functions such as reading and writing. These operations may be accompanied by a read request for a memory (read operation) and may be accompanied by a write request (write operation).

However, in some cases, both of writing and reading are required for a result of the operation depending on the conditions of an application program using the PIM. In this case, the conventional PIM should individually perform reading and writing of the operation result, resulting in performance loss.

Advantages and features of the described technology and methods of achieving the same will become apparent with reference to some embodiments described in detail together with the accompanying drawings. However, the described technology is not limited to the following embodiments and may be implemented in various forms. The embodiments are merely provided to completely disclose the described technology and to fully inform those skilled in the art about the scope of the described technology, and the described technology is defined by the appended claims.

Also, terms used herein are only for describing the embodiments while not limiting the described technology. Herein, the singular forms "a," "an," and "one" include the plural unless the context clearly indicates otherwise. Also, the terms "comprises" and/or "comprising" are used to specify the presence of slated elements, steps, operations, and/or components hut do not preclude the presence or addition of one or more other elements, steps, operations, and/or components.

Hereinafter, embodiments of the described technology will be described in detail with reference to the accompanying drawings. At this time, detailed descriptions of well-known elements or functions will be omitted if the descriptions may obscure the gist of the described technology.

A processing-in-memory (PIM) is an intelligent semiconductor that is packaged by integrating a memory and a processing unit into a single chip. Using a PIM can maximize the performance of a computer system by eliminating the memory bottleneck in traditional computers, in other words, a PIM is a memory having an operation function. Accordingly, the instruction set processed by a PIM includes an instruction for an operation accompanied by reading (i.e., READ-OPERATION) and an instruction tor an operation accompanied by writing (i.e., WRITE-OPERATION) in addition to a READ instruction and a WRITE instruction, which are traditional memory-related instructions.

Figure 1:
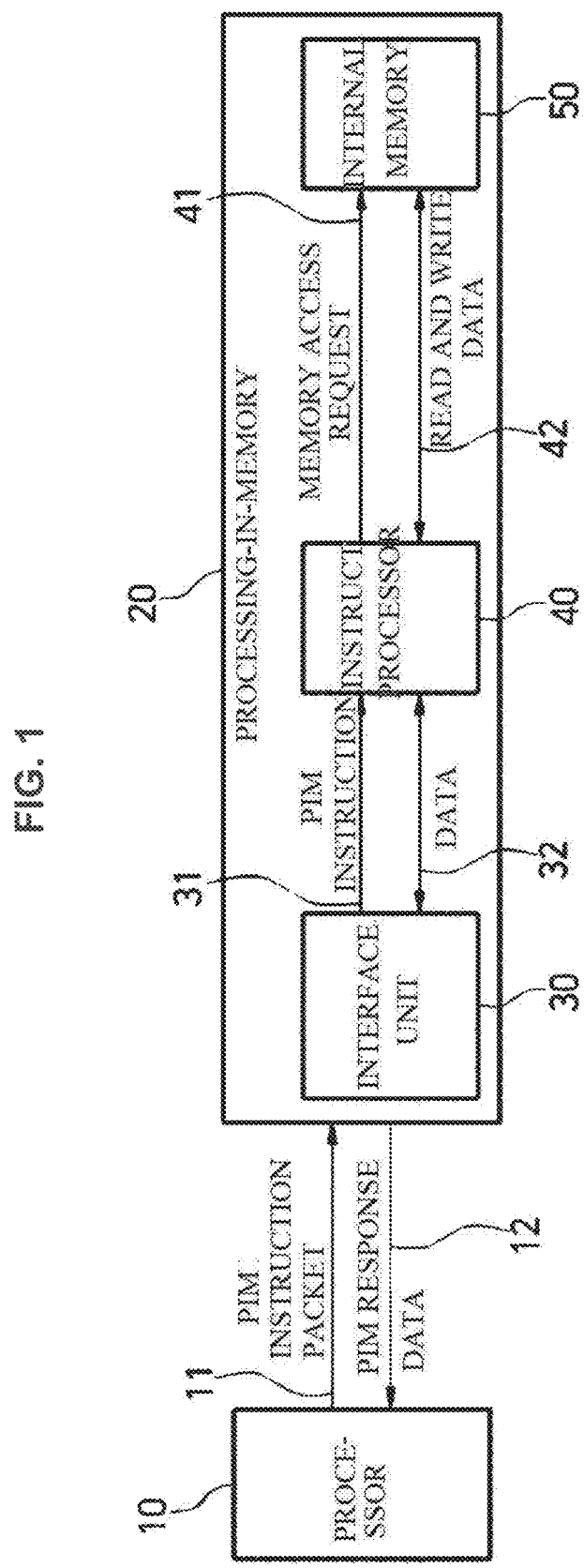
FIG. 1 is a diagram illustrating a relationship between a processing-in-memory (PIM) and a computer system using the PIM.

FIG. 1 is a diagram illustrating a relationship between a computer system using a PIM and internal units of the PIM. As shown in FIG. 1, a computer processor 10 sends a PIM instruction packet 11 to a PIM 20. The PIM instruction packet 11 is received and interpreted by an interface unit 30 inside the PIM. An interpreted PIM instruction 31 is processed by an instruction processor 40. During the instruction processing, the instruction processor 40 requests access to the internal memory 50 of the PIM and performs READ and WRITE actions (41). In the case of OPERATION, the instruction processor 40 provides the operation result to the processor 10 through the interface unit 30 (12) as a response when processing a READ-OPERATION instruction and writes the operation result to a destination address of tire internal memory 50 when processing a WRITE-OPERATION instruction. However, when both of the read action and the write action are required, the processor 10 should re-send a write request to the PIM 20 after the READ-OPERATION or should send a separate read operation to the PIM 20 after the WRITE-OPERATION.

In order to solve the inconveniences, the present inventor has created a READ-WRITE-OPERATION instruction. This READ-WRITE-OPERATION instruction instructs a READ action for returning the operation result to the processor 10 and a WRITE action for writing the operation result to the destination address of the memory 50 to be performed at the same time.

Figure 2:
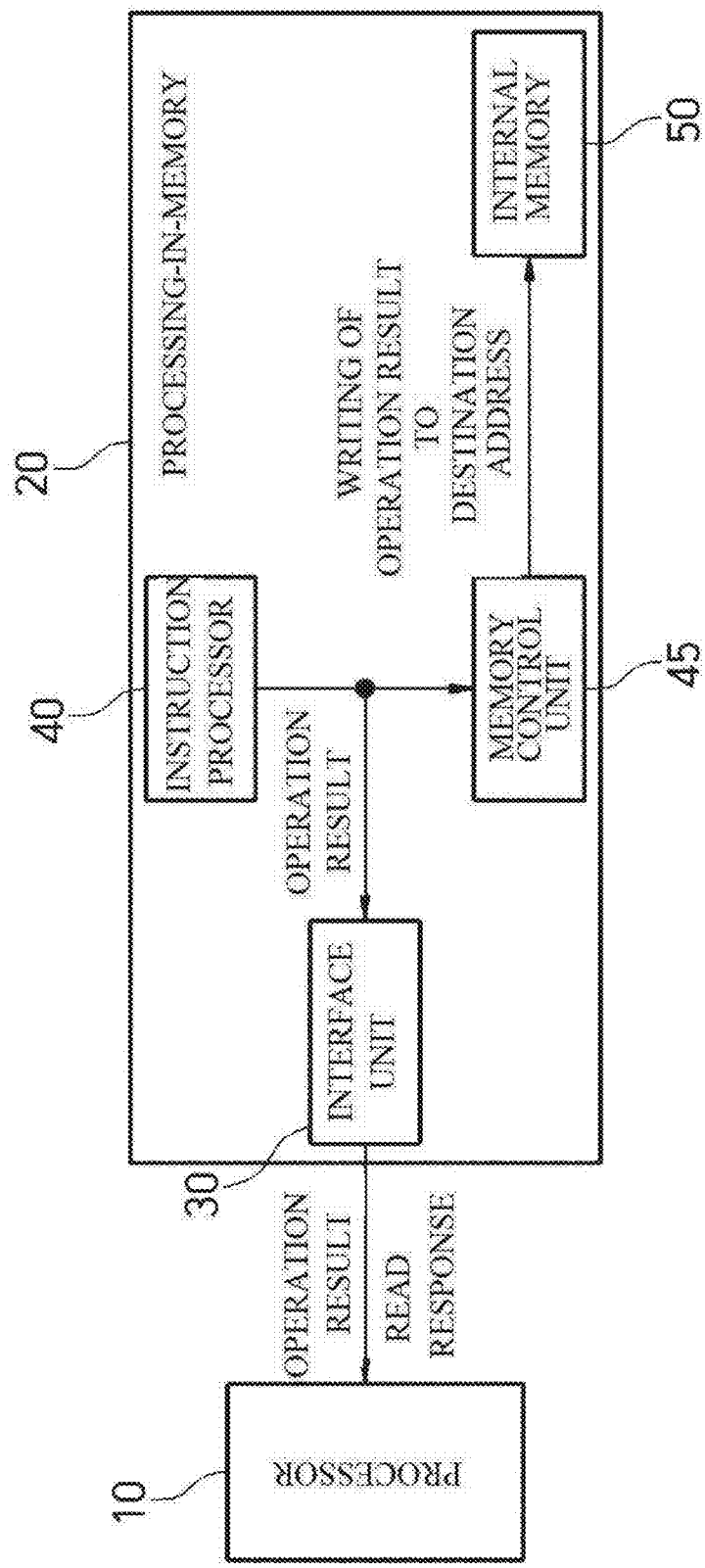
FIG. 2 is a diagram showing a READ-WRITE-OPERATION action in terms of the hardware of a PIM.

FIG. 2 is a diagram showing the READ-WRITE-OPERATION action in terms of the hardware of the PIM 20. When the requested processing of the READ-WRITE-OPERATION is finished, the instruction processor 40 of the PIM 20 delivers the operation result to the interface unit 30 and the memory control unit 45. The interface unit 30 returns the operation result to the computer processor 10 and sends read response data to the computer processor 10. Also, the memory control unit 45 writes the operation result to the destination address of the internal memory 50. Since the interface unit 30 and the memory control unit 45 are independent units, the operation of sensing the operation result and the read response data to the computer processor 10 and the operation of writing the operation result in the internal memory 50 may be performed at the same time.

Figure 3:
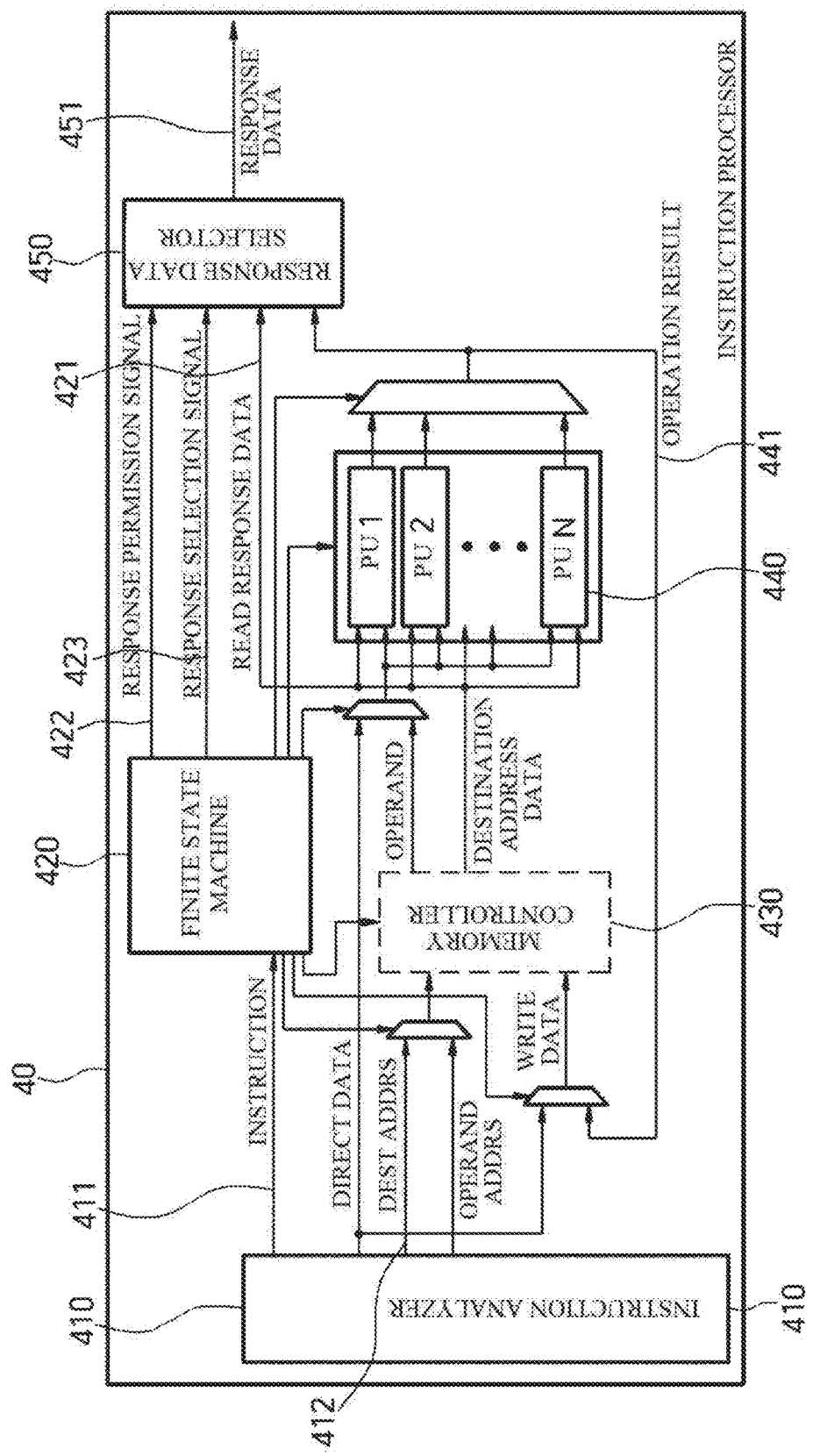
FIG. 3 is a structure diagram of an instruction processor inside a PIM for processing a READ-WRITE-OPERATION instruction of the described technology.

FIG. 3 is a diagram showing the structure of the instruction processor 40 for processing the READ-WRITE-OPERATION instruction of the described technology. A memory controller 430 may be outside or inside the instruction processor 40 but for convenience of description is shown inside the instruction processing unit 230 in dotted lines in FIG. 3.

A processing unit 440 may be implemented with one or more processing units depending on the type of a processable instruction. An instruction analyzer 410 analyzes a PIM instruction packet to extract an instruction 41 and a destination address 412 and extract an operand address or direct data depending on the type of the instruction 411.

A finite state machine 420, when the instruction to be processed is a memory write instruction, performs a memory write action using the direct data as write data. When the instruction to be processed is a memory read instruction, the finite state machine 420 requests data of the destination address from the memory controller 430 and transmits the requested data as read response data 421. In the case of an operation instruction using direct data (an I-type instruction), the finite state machine 420 requests an operand from the destination address, delivers the operand to the processing unit 440 along with the direct data, and returns the operation result 441 to the destination address. On the other hand, in the case of an operation instruction using an operand address (an R-type instruction), the finite state machine 420 requests the operand address from she memory controller 430 first and requests data of the destination address last. Also, the finite state machine 420 delivers collected operands to the processing unit 440 and returns the operation result 441 to the destination address.

The READ-WRITE-OPERATION instruction of the described technology is processed by the finite slate machine 420 and the response data selector 450. FIG. 4 is a diagram showing a detailed structure of the response data selector 450 shown in FIG. 3.

A response selection signal 423 originating from the finite state machine 420 is a signal for controlling a multiplexer (MUX) of the response data selector 450 to select one of the read response data 421 and the operation result 441 that are input to the MUX. A response permission signal 422 originating from the finite state machine 420 is a signal for controlling a three-phase buffer (BUF) to allow or disallow the output of the read response data 421 or the operation result 441 selected by the MUX as response data 451.

In the case of READ instruction, the read response data 421 is selected through the MUX by the finite state machine 420, and the response data 45 is allowed by the BUF. In the case of WRITE instruction, the response data 451 is disallowed by the BUF and presented from being output.

In the case of READ-OPERATION instruction, the finite state machine 420 operates such that the operation result 441 is selected through the MUX and the response data 451 is allowed through the BUF to output the operation result.

In the case of READ-WRITE instruction, the BUF is controlled using the response permission signal 422 to disallow the response data 451, and the operation result 441 is returned to the memory 50 (see FIG. 2) through the memory controller 430 as in the structure shown in FIG. 3.

In the case of READ-WRITE-OPERATION instruction, according to the described technology, the finite slate machine 420 allows the processing unit 440 to send the operation result 441 to the memory controller 430 so that the memory controller 430 can write the operation result 441 to the internal memory. At the same time, the finite state machine 420 controls the MUX of the response data selector 450 through the response selection signal 423 such that the read response 421 or the operation result 441 is selected, and controls die BUF of the response data selector 450 through the response permission signal 422 such that the output of the read response 421 or operation result selected by the MUX as the response data 451 is allowed or disallowed. Accordingly, the READ-WRITE-OPERATION instruction of the described technology allows an action of writing the operation result 441 to the destination address of the internal memory 50 (FIG. 2) and an action of outputting the response data 451 to be performed at the same time.

The described technology has been described in detail with reference to some embodiments, but those skilled in the art can understand that the described technology may be carried out in specific forms different from those described herein without changing the technical spirit or essential features of the described technology. Therefore, the above-described embodiments are to be regarded as illustrative rather than restrictive. Therefore, the scope of the described technology is defined not by the detailed description but by the appended claims, and all changes or modifications derived from the claims and their equivalents will be coast rued as being included in the scope of the described technology.

What is claimed is:

1. A method of processing a read-write-operation instruction in a processing-in-memory, the method comprising:
   receiving, by an interface of a processing-in-memory, an instruction packet from a computer processor of a computer system;
   interpreting, by the interface, the received instruction packet to obtain an instruction; and
   in response to the obtained instruction being a read-write-operation instruction that requires a read action and a write action to be performed at the same time, processing, by an instruction processor of the processing-in-memory, the read-write-operation instruction to send a read response and an operation result to the computer system via the interface of the processing-in-memory after processing the instruction, and at the same time, write the operation result to an internal memory of the processing-in-memory via a memory controller of the processing-in-memory which is independent of the interface of the processing-in-memory,
   the instruction processor processing the read-write-operation instruction without the computer processor re-sending a write request to the processing-in-memory after a read operation, or without the computer processor sending a separate read operation to the processing-in-memory after a write operation.

2. The method of claim 1, wherein processing the read-write-operation instruction comprises:
   selecting one of the read response and the operation result to be sent to the computer system; and
   disallowing or outputting the selected one of the read response or the operation result as response data.

3. The method of claim 2, further comprising:
   generating a response selection signal for selecting one of the read response and the operation result to be sent to the computer system; and
   generating a response permission signal for disallowing or outputting the selected one of the read response or the operation result as the response data.

4. An apparatus for processing a read-write-operation instruction, the apparatus comprising:
   a processing-in-memory comprising:
      an internal memory;
      a memory controller configured to control the internal memory;
      an interface configured to receive an instruction packet from a computer processor of a computer system and interpret the received instruction packet to obtain an instruction; and
      an instruction processor configured tom response to the obtained instruction being a read-write-operation instruction that is configured to require a read action and a write action to be performed at the same time, process the read-write-operation instruction to send a read response and an operation result to the computer system via the interface after processing the instruction, and at the same time, to write the operation result to the internal memory via the memory controller which is independent of the interface,
      the instruction processor being configured to process the read-write-operation instruction without the computer processor re-sending a write request to the processing-in-memory after a read operation, or without the computer processor sending a separate read operation to the processing-in-memory after a write operation.

5. The apparatus of claim 4, wherein the instruction processor comprises:
   a response data selector comprising a selector configured to select one of the read response or the operation result to be sent to the computer system, and a three-phase buffer configured to close or output the read response or the operation result selected by the selector as response data.

6. The apparatus of claim 5, wherein the instruction processor further comprises:
   a finite state machine configured to generate a response selection signal for controlling the selector of the response data selector to select one of the read response or the operation result and generate a response permission signal for controlling the three-phase buffer of the response data selector to disallow or output the read response or the operation result selected by the selector as response data.

7. The method of claim 1, further comprising:
   generating a response selection signal for selecting one of the read response or the operation result to be sent to the computer system;
   generating a response permission signal for disallowing or outputting the selected one of the read response or the operation result; and
   when performing the read-write-operation instruction, while allowing the instruction processor to send the operation result to the memory controller so that the memory controller writes the operation result to the internal memory, controlling a response data selector of the instruction processor through the response selection signal such that the read response or the operation result is selected, and controlling the response data selector through the response permission signal such that the read response or the operation result selected by the response data selector is allowed or disallowed.

8. The apparatus of claim 4, wherein the instruction processor further comprises:
   a response data selector comprising a selector configured to select one of the read response or the operation result to be sent to the computer system, and
   a finite state machine configured to generate a response selection signal to select one of the read response or the operation result to be sent to the computer system, and further configured to generate a response permission signal to disallow or output the read response or the operation result selected by the selector as response data,
   wherein, when the read-write-operation instruction is performed, while the instruction processor is allowed to send the operation result to the memory controller so that the memory controller writes the operation result to the internal memory, the response data selector of the instruction processor is configured to be controlled through the response selection signal such that the read response or the operation result is selected, and is further configured to be controlled through the response permission signal such that the read response or the operation result selected by the response data selector is allowed or disallowed.

* * * * *